(12) United States Patent
Nakata et al.

(10) Patent No.: US 10,504,547 B2
(45) Date of Patent: Dec. 10, 2019

(54) PERPENDICULAR MAGNETIC RECORDING MEDIUM

(71) Applicant: FUJI ELECTRIC CO., LTD., Kawasaki-shi (JP)

(72) Inventors: Hitoshi Nakata, Sendai (JP); Takehito Shimatsu, Sendai (JP)

(73) Assignee: Fuji Electric Co., Ltd., Kawasaki-shi, Kanagawa (JP)

( * ) Notice: Subject to any disclaimer, the term of this patent is extended or adjusted under 35 U.S.C. 154(b) by 314 days.

(21) Appl. No.: 15/027,985

(22) PCT Filed: Jan. 13, 2015

(86) PCT No.: PCT/JP2015/000119
§ 371 (c)(1),
(2) Date: Apr. 7, 2016

(87) PCT Pub. No.: WO2015/111384
PCT Pub. Date: Jul. 30, 2015

(65) Prior Publication Data
US 2016/0254017 A1     Sep. 1, 2016

(30) Foreign Application Priority Data
Jan. 23, 2014   (JP) ................................ 2014-010590

(51) Int. Cl.
*G11B 5/66* (2006.01)
*G11B 5/65* (2006.01)
*G11B 5/73* (2006.01)

(52) U.S. Cl.
CPC ................ *G11B 5/653* (2013.01); *G11B 5/65* (2013.01); *G11B 5/66* (2013.01); *G11B 5/7379* (2019.05)

(58) Field of Classification Search
CPC .................................. G11B 5/653; G11B 5/66
See application file for complete search history.

(56) References Cited

U.S. PATENT DOCUMENTS 7,282,278 B1 *  10/2007  Nolan ...................... G11B 5/65
                                                    428/831.2
8,743,666 B1 *   6/2014  Bertero .................... G11B 5/66
                                                    369/13.06
(Continued)

FOREIGN PATENT DOCUMENTS

CN       102385871 A      3/2012
CN       102725793 A     10/2012
(Continued)

OTHER PUBLICATIONS

Official Notice of Rejection in counterpart Japanese Patent Application No. 2015-558779, dated Feb. 21, 2017.
(Continued)

*Primary Examiner* — Holly C Rickman
(74) *Attorney, Agent, or Firm* — Venable LLP; Henry J. Daley

(57) ABSTRACT

The purpose of the present invention is to provide a magnetic recording medium including a first magnetic recording layer having a large coercive force and a granular structure in which magnetic crystal grains are well separated from each other. The magnetic recording medium of the present invention includes a non-magnetic substrate, a first seed layer, and a first magnetic recording layer formed on the first seed layer, wherein the first seed layer includes Pt, the first magnetic recording layer includes one or more magnetic layers, the magnetic layer in contact with the first seed layer includes Fe, Pt and Ti, and the magnetic layer in contact with the first seed layer has a granular structure consisting of magnetic crystal grains of a $L1_0$ type ordered alloy including Fe and Pt, and a non-magnetic grain boundary including Ti.

6 Claims, 11 Drawing Sheets

(56) References Cited

U.S. PATENT DOCUMENTS

| | | | |
|---|---|---|---|
| 9,734,857 B2* | 8/2017 | Kim | G11B 5/82 |
| 2001/0036564 A1 | 11/2001 | Ohmori | |
| 2002/0028355 A1 | 3/2002 | Nakamura et al. | |
| 2002/0098383 A1 | 7/2002 | Maeda et al. | |
| 2003/0214742 A1 | 11/2003 | Kai et al. | |
| 2004/0161638 A1 | 8/2004 | Maeda et al. | |
| 2005/0146992 A1 | 7/2005 | Inomata et al. | |
| 2006/0280862 A1 | 12/2006 | Yasui et al. | |
| 2012/0052330 A1 | 3/2012 | Takekuma et al. | |
| 2012/0196154 A1 | 8/2012 | Uchida | |
| 2012/0225325 A1 | 9/2012 | Nemoto et al. | |
| 2012/0300600 A1* | 11/2012 | Kanbe | G11B 5/314 |
| | | | 369/13.32 |

FOREIGN PATENT DOCUMENTS

| | | | |
|---|---|---|---|
| JP | 2001-291230 A | 10/2001 | |
| JP | 2002-092843 A | 3/2002 | |
| JP | 2003-296901 A | 10/2003 | |
| JP | 2004-178753 A | 6/2004 | |
| JP | 2005-222669 A | 8/2005 | |
| JP | 2005-285207 A | 10/2005 | |
| JP | 3730518 B2 | 1/2006 | |
| JP | 2007-018688 A | 1/2007 | |
| JP | 2009-158053 A | 7/2009 | |
| JP | 2012-048784 A | 3/2012 | |
| JP | 2012-160242 A | 8/2012 | |
| JP | 2012-181902 A | 9/2012 | |

OTHER PUBLICATIONS

Inaba et al., "New High Density Recording Technology: Energy Assisted Recording Media," Fuji Electric Journal, R&D Headquarters of Fuji Electric Co., Ltd., Jul. 10, 2010, vol. 83, Issue 4, pp. 257-260.

International Search Report in PCT International Application No. PCT/JP2015/000119, dated Mar. 31, 2015.

Office Action in counterpart Chinese Patent Application No. 201580002172.5, dated Mar. 5, 2018.

Office Action in counterpart Chinese Patent Application No. 201580002172.5, dated Nov. 12, 2018.

* cited by examiner

PERPENDICULAR MAGNETIC RECORDING MEDIUM

TECHNICAL FIELD

The invention described in the present specification relates to a perpendicular magnetic recording medium. In particular, the invention relates to a perpendicular magnetic recording medium used in a hard disc magnetic recording device (HDD). More specifically, the invention described in the present specification relates to a perpendicular magnetic recording medium used for energy-assisted magnetic recording system.

BACKGROUND ART

Perpendicular magnetic recording system is adopted as a technique for increasing the magnetic recording density. A perpendicular magnetic recording medium at least comprises a substrate, and a magnetic recording layer formed of a hard-magnetic material. Optionally, the perpendicular magnetic recording medium may further comprise: a soft-magnetic backing layer formed of a soft magnetic material and playing a role in concentrating the magnetic flux generated by a magnetic head onto the magnetic recording layer; a base layer for orienting the hard-magnetic material in the magnetic recording layer in an intended direction; a protective film for protecting the surface of the magnetic recording layer; and the like.

Japanese Patent Laid-Open No. 2001-291230 discloses a granular magnetic material as a material for forming the magnetic recording layer in the perpendicular magnetic recording medium (see PTL1). The granular magnetic material comprises magnetic crystal grains and non-magnetic substance segregated to surround the magnetic crystal grains. Magnetic crystal grains within the granular magnetic material are magnetically separated from each other by the non-magnetic substance.

For the purpose of further increasing the recording density of perpendicular magnetic recording media, an urgent need for reduction in the grain diameters of the magnetic crystal grains arises in recent years. On the other hand, reduction in the grain diameters of the magnetic crystal grains leads to a decrease in thermal stability of the recorded magnetization (signals). In order to compensate for the decline in thermal stability due to the reduction in the grain diameters of the magnetic crystal grains, the magnetic crystal grains in the granular magnetic material need to be formed of materials with higher magnetocrystalline anisotropies.

One of proposed materials having the required higher magnetocrystalline anisotropies is $L1_0$ ordered alloys. Japanese Patent Laid-Open No. 2004-178753 describes $L1_0$ ordered alloys containing at least one type of element selected from the group consisting of Fe, Co and Ni, and at least one type of element selected from the group consisting of Pt, Pd, Au and Ir, and the method for preparing the $L1_0$ ordered alloys (see PTL2). Typical $L1_0$ ordered alloys include FePt, CoPt, FePd, CoPd, and the like.

The use of ordered alloys as a magnetic material has been proposed in various fields. Japanese Patent Laid-Open No. 2003-296901 describes a spin memory type magnetic recording medium comprising a base layer, a magnetic recording layer including Co-based alloy or an ordered alloy, an intermediate layer, and a highly polarized spin controlling layer (see PTL3). Here, the ordered alloy may include $Fe_{50}Pt_{50}$, $Fe_{50}Pd_{50}$, and $Co_3Pt_1$. Further, there is a description that the magnetic properties may be improved by adding an additive element such as Cu, Cr, or Ti to the Co-based alloy or the ordered alloy which forms the magnetic recording layer. In addition, there is a description that the gaps between magnetic crystal grains formed of the Co-based alloy or the ordered alloy may be filled with a non-magnetic substance consisting of Cr, Ta, B, oxides, or nitrides. Further, there is a description that a Pt film can be used as the base layer for the magnetic recording layer consisting of FePt. However, Japanese Patent Laid-Open No. 2003-296901 does not suggest solutions of various problems which are needed to overcome when adopting the ordered alloys in HDD's, since the above patent literature relates to spin memory type magnetic recording. Further, the above patent literature does not teach or suggest the use of Ti as the non-magnetic substance for filling the gaps between the magnetic crystal grains formed of the ordered alloy.

On the other hand, reduction in the sizes of the magnetic crystal grains means reduction in the cross-sectional areas of the crystal magnetic grains having a certain height, since the thickness of the magnetic recording layer is basically uniform in an in-plane direction of the medium. Therefore, a diamagnetic field acting on the magnetic crystal grains themselves decreases whereas a magnetic field required reversing the magnetization of the magnetic crystal grains (magnetic switching field) increases. As described above, the improvement of the recording density implies that a larger magnetic field is required for recording signals, in view of the shape of the magnetic crystal grains, In regard to the problem of increase in magnetic field strength required for signal recording, there is proposed a method for reversing the magnetization with weak magnetic field with the help of magnetic domain wall displacement. Japanese Patent Laid-Open No. 2005-285207 describes a process for producing a magnetic thin film comprising forming a FePt magnetic thin film by sputtering onto a substrate whose surface temperature is 650-850° C., wherein the magnetic thin film has a coercive force of 40 kOe (3200 A/mm), and magnetization can be reversed with a magnetic field of 4-10 kOe (320-800 A/mm) (see PTL4). The above patent literature discloses that a base layer consisting of MgO, ZnO, Cr or Pt may be disposed when glass is used as the substrate. In order to utilize the magnetic domain wall displacement, it is necessary that the magnetic thin film in this method is a discontiguous layer consisting of isolated island-like FePt particles. That is, the magnetic thin film does not have a structure in which a non-magnetic body is filled within gaps between the FePt particles.

Energy-assisted magnetic recording systems such as a heat-assisted recording system or a microwave-assisted recording system have been proposed as the other means against the problem of increase in the magnetic field strength required for signal recording (see NPL1). The heat-assisted recording system utilizes the temperature dependence of the magnetic anisotropy constant (Ku) of a magnetic material, which is a characteristic where the higher the temperature, the lower the Ku. This system uses a head having functions to heat a magnetic recording layer. In other words, this system executes writing while reducing a magnetic switching field by raising the temperature of the magnetic recording layer to temporarily reduce the Ku. The recorded signals (magnetization) can be maintained stably, since the Ku returns its original high value after the temperature of the magnetic recording layer drops. In the application of the heat-assisted system, a magnetic recording layer needs to be designed taking its temperature characteristics into consideration, in addition to the conventional design guidelines.

CITATION LIST

Patent Literature

PTL1: Japanese Patent Laid-Open No. 2001-291230
PTL2: Japanese Patent Laid-Open No. 2004-178753
PTL3: Japanese Patent Laid-Open No. 2003-296901
PTL4: Japanese Patent Laid-Open No. 2005-285207

Non Patent Literature

NPL1: Inaba et al., "New High Density Recording Technology: Energy Assisted Recording Media", Fuji Electric Journal, R&D Headquarters of Fuji Electric Co., Ltd., Jul. 10, 2010, Vol. 83, Issue 4, pp. 257-260

SUMMARY OF INVENTION

Technical Problem

The problem to be solved by the invention described in the present specification is to provide a magnetic recording medium comprising a magnetic recording layer having a large coercive force and a granular structure in which magnetic crystal grains are well separated from each other.

Solution to Problem

One example of the magnetic recording medium described in the present specification comprises a non-magnetic substrate, a first seed layer, and a first magnetic recording layer formed on the first seed layer, wherein the first seed layer comprises Pt, the first magnetic recording layer comprises one or more magnetic layers, the magnetic layer in contact with the first seed layer comprises Fe, Pt and Ti, and has a granular structure consisting of magnetic crystal grains of a $L1_0$ type ordered alloy comprising Fe and Pt, and a non-magnetic grain boundary comprising Ti. Here, the magnetic layer in contact with the first seed layer may comprise 4 at % or more and 12 at % or less of Ti, based on the total number of atoms. Besides, the $L1_0$ type ordered alloy may further comprise at least one element selected from the group consisting of Ni, Mn, Ag, Au and Cr. The first magnetic recording layer may consist of one magnetic layer. Further, the magnetic recording medium may further comprise one or more layers selected from the group consisting of a heat sink layer, an adhesive layer, a soft magnetic backing layer, and a base layer, between the non-magnetic substrate and the first seed layer. Besides, the magnetic recording medium may further comprise a second seed layer and a second magnetic recording layer, between the non-magnetic substrate and the first seed layer. In this case, the second magnetic recording layer is in contact with the first seed layer.

Advantageous Effects of Invention

By adopting the above-described configuration, it becomes possible to obtain the first magnetic recording layer having a large coercive force in which the $L1_0$ type FePt magnetic crystal grains are well separated from each other with the non-magnetic grain boundary comprising Ti under the action of the first seed layer comprising Pt. The magnetic recording medium comprising the first magnetic recording layer thus obtained is appropriate to be used in the energy-assisted magnetic recording system.

DESCRIPTION OF EMBODIMENTS

A configuration example of the magnetic recording medium of the first embodiment comprises a non-magnetic substrate, a first seed layer, and a first magnetic recording layer formed on the first seed layer, wherein the first seed layer comprises Pt, the first magnetic recording layer comprises one or more magnetic layers, the magnetic layer in contact with the first seed layer comprises Fe, Pt and Ti, and the magnetic layer in contact with the first seed layer has a granular structure consisting of magnetic crystal grains of a $L1_0$ type ordered alloy comprising Fe and Pt, and a non-magnetic grain boundary comprising Ti.

Figure 1:
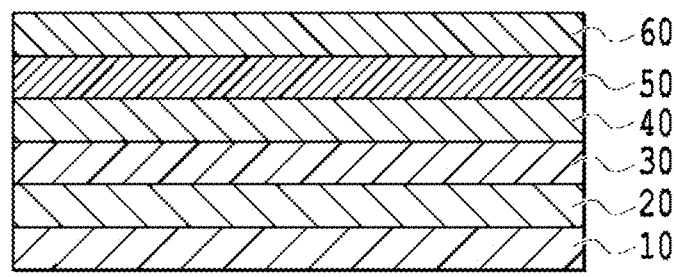
FIG. 1 is a cross-sectional diagram showing a configuration example of the magnetic recording medium of the first embodiment.

FIG. 1 shows a configuration example of the magnetic recording medium of the first embodiment, in which the first magnetic recording layer consists of one magnetic layer. In this configuration example, the magnetic recording medium has non-magnetic substrate 10, adhesive layer 20, base layer 30, first seed layer 40, first magnetic recording layer 50, and protective layer 60. The adhesive layer 20, the base layer 30, and the protective layer 60 in the configuration example shown in FIG. 1 are layers which may be formed optionally. The magnetic recording medium described in the present specification may further comprise a heat sink layer, a soft-magnetic backing layer, an intermediate layer or the like between the non-magnetic substrate 10 and the first magnetic recording layer 50.

The non-magnetic substrate 10 may be various substrates having a flat surface. For example, the non-magnetic substrate 10 may be formed of material commonly used in magnetic recording media. Useful material includes, NiP-plated Al alloy, monocrystalline MgO, $MgAl_2O_4$, $SrTiO_3$, tempered glass, crystallized glass, and the like.

The adhesive layer 20 that may be formed optionally is used for enhancing the adhesion between the layer formed on it and the layer formed under it. The layer formed under the adhesive layer includes the non-magnetic substrate 10. The material used for forming the adhesive layer 20 includes a metal such as Ni, W, Ta, Cr or Ru, or an alloy containing these metals. The adhesive layer may have a single-layered structure or a laminated structure with plural layers.

The soft-magnetic backing layer (not shown) that may be formed optionally controls the magnetic flux emitted from a magnetic head, to improve the read-write characteristics of the magnetic recording medium. The material used for forming the soft-magnetic backing layer include: a crystalline material such as NiFe alloy, sendust (FeSiAl) alloy, or CoFe alloy; a microcrystalline material such as FeTaC, CoFeNi or CoNiP; and an amorphous material including Co alloy such as CoZrNb or CoTaZr. The optimum thickness of the soft-magnetic backing layer depends on the structure and characteristics of the magnetic head used in magnetic recording. When forming the soft-magnetic backing layer continuously with other layers, the soft-magnetic backing layer preferably has a thickness in a range from 10 nm to 500 nm (both inclusive), in view of productivity.

When using the magnetic recording medium in a heat-assisted magnetic recording system, a heat sink layer (not shown) may be provided. The heat sink layer is a layer for effectively absorbing excess heat of the first magnetic recording layer 50 that is generated during heat-assisted magnetic recording. The heat sink layer can be formed of a material having a high thermal conductivity and a high specific heat capacity. Such material includes a Cu simple substance, an Ag simple substance, an Au simple substance, or an alloy material composed mainly of these substances. As used herein, the expression "composed mainly of" means that the content of the material concerned is 50 wt % or more. In consideration of its strength or the like, the heat sink layer can be formed of an Al—Si alloy, a Cu—B alloy or the like. Further, the function of concentrating a perpendicular magnetic field generated by the head, which is the function of the soft-magnetic backing layer can be imparted to the heat sink layer by forming the heat sink layer of sendust (FeSiAl) alloy, a soft-magnetic CoFe alloy, or the like. The optimum thickness of the heat sink layer depends on the amount and distribution of heat generated during heat-assisted magnetic recording, as well as the layer configuration of the magnetic recording medium and the thickness of each constituent layer. When forming the heat sink layer continuously with other constituent layers, the heat sink layer preferably has a thickness of 10 nm or more and 100 nm or less. The heat sink layer can be formed by any process known in the art, such as a sputtering method (including a DC magnetron sputtering method), a vacuum deposition method, or the like. Normally, the heat sink layer is formed by the sputtering method. The heat sink layer can be formed between the non-magnetic substrate 10 and the adhesive layer 20, between the adhesive layer 20 and the base layer 30, or the like, in view of properties required for the magnetic recording medium.

The base layer 30 is a layer provided for the purpose of preventing the crystalline structure of the layer formed below from affecting the crystalline orientation and the size of the magnetic crystal grains in the first magnetic recording layer 50. In the case where the soft-magnetic backing layer is provided, the base layer 30 needs to be non-magnetic, in order to prevent the magnetic influence on the soft-magnetic backing layer. The material for forming the base layer 30 includes oxides such as MgO or $SrTiO_3$, nitrides such as TiN, metals such as Cr or Ta, a NiW alloy, and Cr-based alloys such as CrTi, CrZr, CrTa, CrW and the like. The base layer 30 can be formed by any processes known in the art, such as sputtering The first seed layer 40 is a layer for controlling the grain diameter and the crystalline orientation of the magnetic crystal grains in a magnetic layer which is in contact with the first seed layer 40, while ensuring adhesion between the base layer 30 and the first magnetic recording layer 50. Specifically, the first seed layer 40 has a function to promote separation between the magnetic crystal grains comprising $L1_0$ type ordered alloy and the non-magnetic grain boundary comprising Ti in the magnetic layer formed thereon, to increase the coercive force Hc of the first magnetic recording layer 50 including the above-described magnetic layer. The first seed layer 40 comprises Pt, and preferably consists of Pt. The first seed layer 40 can be formed by any process known in the art such as a sputtering method (including RF magnetron sputtering method), a vacuum deposition method, or the like. The first seed layer 40 can be formed under the state where the non-magnetic substrate 10 is heated at a temperature ranging from 250° C. to 700° C. The first seed layer 40 has a thickness of 0.1 nm or more, preferably from 0.5 nm to 50 nm, and more preferably from 1 nm to 20 nm.

The protective layer 60 can be formed of a material that is conventionally used in the field of magnetic recording media. Specifically, the protective layer 60 can be formed of non-magnetic metal such as Pt, a carbon-based material such as diamond-like carbon, or silicon-based material such as silicon nitride. The protective layer 60 may have a single-layered structure or a laminated structure. The laminated structure of the protective layer 60 may be a laminated structure of two types of carbon-based material having different characteristics from each other, a laminated structure of metal and a carbon-based material, or a laminated structure of metallic oxide film and a carbon-based material, for example. The protective layer 60 can be formed by any process known in the art such as a sputtering method (including a DC magnetron sputtering method), a vacuum deposition method, or the like.

Optionally, the magnetic recording medium may further comprise a liquid lubricant layer (not shown) disposed on the protective layer 60. The liquid lubricant layer can be formed of a material conventionally used in the field of magnetic recording media, such as perfluoropolyether-based lubricants or the like. The liquid lubricant layer can be formed by a coating method such as a dip-coating method, a spin-coating method, or the like, for example.

The first magnetic recording layer 50 comprises one or more magnetic layers. Hereinafter, the magnetic layer in contact with the first seed layer 40 is referred to as a first magnetic layer. The first magnetic layer comprises Fe, Pt and Ti. The first magnetic layer has a granular structure consisting of: magnetic crystal grains comprising an $L1_0$ type ordered alloy comprising Fe and Pt; and a non-magnetic grain boundary comprising Ti.

The $L1_0$ type ordered alloy from which the magnetic crystal grains are composed may further comprise at least one element selected from the group consisting of Ni, Mn, Ag, Au and Cr, for the purpose of modification of properties of the magnetic crystal grains. Desirable modification of properties includes lowering the temperature required for ordering of the $L1_0$ type ordered alloy.

All atoms in the magnetic crystal grains may not necessarily have an ordered structure. Rather, it is necessary that a degree of order S indicating the degree of an ordered structure is not less than a predetermined value. The degree of order S is determined by the ratio of a measured value obtained by X-ray diffractometry (XRD) of a magnetic recording medium and a theoretical value in the case where the magnetic crystal grains are completely ordered. In the case of a $L1_0$ type ordered alloy, the degree of order S is calculated with an integrated intensity of (001) and (002) peaks derived from the ordered alloy. The degree of order S can be obtained as a square root of a quotient of a ratio of the measured integrated intensity of the (001) peak to that of the (002) peak divided by a theoretically calculated ratio of the integrated intensity of the (001) peak to that of the (002) peak in the case where the ordered alloy is completely ordered. If thus obtained degree of order S is not less than 0.5, the magnetic crystal grains have a magnetic anisotropy constant Ku practical for the magnetic recording medium.

The non-magnetic grain boundary comprises Ti, and preferably consists of Ti. The first magnetic layer comprises 4 at % or more and 12 at % or less, preferably 5 at % or more and 10 at % or less of Ti, based on the total number of atoms in the layer. The term "at %" means a percentage by atoms in the present specification. By comprising Ti in an amount within the above-described range, it become possible to promote separation between the magnetic crystal grains and the non-magnetic grain boundary, and to significantly increase the coercive force Hc of the magnetic layer.

In another embodiment of the first magnetic recording layer 50, a second magnetic layer is further disposed in addition to the above-described first magnetic layer. It becomes possible to further improve the performance of the magnetic recording medium, by disposing the second magnetic layer.

One of constitution examples is a constitution in which a second magnetic layer is further disposed, the second magnetic layer having a Curie temperature Tc different from that of the first magnetic layer and a purpose of controlling Tc. Hereinafter, such second magnetic layer is referred to as "Tc control magnetic layer". The magnetic switching field of the entire magnetic recording medium, which is required at the time of recording, can be reduced by setting the recording temperature in accordance with the Tc's of both of the magnetic layers. For example, the Curie temperature of the Tc control magnetic layer is set below that of the first magnetic layer. Then, if the recording temperature is set between the Curie temperatures of both of the magnetic layers, the magnetic field required to reverse a record is reduced, due to disappearance of the magnetization of the Tc control magnetic layer at the time of recording. As described above, it becomes possible to exhibit a favorable magnetic recording performance by reducing the magnetic field generated during recording which is required to a magnetic recording head.

The Tc control magnetic layer preferably has a granular structure. Particularly preferably, the magnetic crystal grains of the first magnetic layer and the Tc control magnetic layer are disposed approximately at the same position. It becomes possible to improve performances such as signal-to-noise ratio (SNR) when the magnetic crystal grains are approximately at the same position.

The magnetic crystal grains for composing the Tc control magnetic layer is preferably formed of a material comprising at least one element of Co and Fe, and preferably further comprising at least one element among Pt, Pd, Ni, Mn, Cr, Cu, Ag and Au. For example, CoCr-based alloys, CoCrPt-based alloys, FePt-based alloys, FePd-based alloys and the like can be used. The crystalline structure of the magnetic crystal grains may be an ordered structure such as $L1_0$, $L1_1$ and $L1_2$ types, a hexagonal closest packing (hcp) structure, a face-centered cubic (fcc) structure, or the like. Oxides such as ZnO, $SiO_2$, or $TiO_2$, nitrides such as SiN or TiN, C, or B and the like can be used as the material of the non-magnetic body that composes the Tc control magnetic layer.

A layer formed of the same material as the first magnetic layer but having a different composition may be used as the Tc control magnetic layer. For example, the Tc control magnetic layer may be a layer in which the content of Ti in the first magnetic layer is altered, a layer in which the element such as Ni which is added to the ordered alloy is changed, or the like.

It is preferable to dispose an exchange coupling control layer between the first magnetic layer and the Tc control magnetic layer, in order to adjust magnetic exchange coupling between these layers. The magnetic switching field can be adjusted by controlling the magnetic exchange coupling at the recording temperature. The exchange coupling control layer may be a magnetic layer or a non-magnetic layer, in accordance with desired exchange coupling. The non-magnetic layer is preferable for enhancing the effect of reducing the magnetic switching field at the recording temperature.

A capping layer may be disposed as the second magnetic layer formed onto the first magnetic layer. The capping layer may be a magnetic layer which is magnetically continuous within the magnetic layer. Magnetization reversal of the magnetic recording medium can be adjusted by disposing this continuous magnetic layer.

The material for composing the continuous magnetic layer is preferably a material comprising at least one element of Co and Fe, and preferably further comprising at least one element among Pt, Pd, Ni, Mn, Cr, Cu, Ag, Au and rare-earth elements. For example, CoCr-based alloys, CoCrPt-based alloys, FePt-based alloys, FePd-based alloys, CoSm-based alloys and the like can be used. The continuous magnetic layer may have a polycrystalline structure or an amorphous structure. When the continuous magnetic layer has a polycrystalline structure, the crystalline structure may be an ordered structure such as $L1_0$, $L1_1$ and $L1_2$ types, a hexagonal closest packing (hcp) structure, a face-centered cubic (fcc) structure, or the like.

The second magnetic layer has a function to maintain magnetization corresponding to intended information to be recorded (for example, information of 0 or 1) in cooperation with the first magnetic recording layer at a temperature where the information is stored, and/or a function of facilitating recording in cooperation with the first magnetic recording layer at a temperature where the information is recorded. In order to attain this purpose, other type of a second magnetic layer can be added, instead of the above-described Tc control magnetic layer and/or continuous magnetic layer, or in addition to the above-described Tc control magnetic layer and/or continuous magnetic layer. For example, it is possible to add a second magnetic layer for modifying magnetic properties, a second magnetic layer for controlling ferromagnetic resonance frequency for microwave assisted magnetic recording. Here, the magnetic properties to be modified includes an anisotropy constant Ku, a magnetic switching field, a coercive force Hc, a saturation magnetization Ms, and the like. The second magnetic layer to be added may be a single layer, or may have a laminated structure of different layers which may have different composition. Alternatively, a plurality of second magnetic layers having different constitutions may be added.

The second magnetic layer, the exchange coupling control layer, and the like can be formed by a sputtering method, a vacuum deposition method, or the like. Further, the substrate may be optionally heated during formation of the second magnetic layer, the exchange coupling control layer, and the like.

Another constitutional example of the first embodiment may include a constitution in which the laminated body of the first seed layer 40 and the first magnetic recording layer is repeatedly laminated.

One example of the magnetic recording medium of the second embodiment further comprises a second seed layer and a second magnetic recording layer between the non-magnetic substrate and the first seed layer of the magnetic recording medium of the first embodiment, in which the second magnetic recording layer is in contact with the first seed layer.

Figure 2:
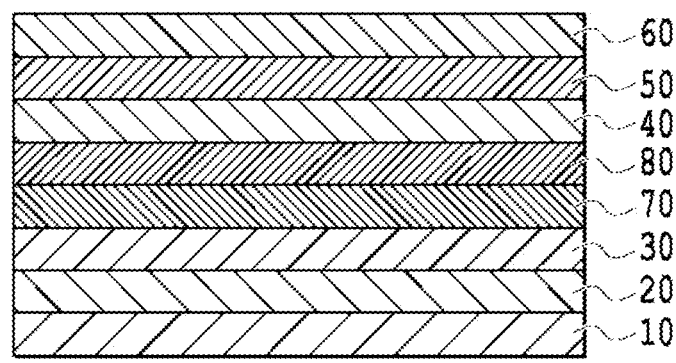
FIG. 2 is a cross-sectional diagram showing a configuration example of the magnetic recording medium of the second embodiment.

FIG. 2 shows a constitutional example of the magnetic recording medium of the second embodiment in which the first magnetic recording layer 50 consists of a single layer. In this constitutional example, the magnetic recording medium comprises non-magnetic substrate 10, adhesive layer 20, base layer 30, second seed layer 70, second magnetic recording layer 80, first seed layer 40, first magnetic recording layer 50, and protective layer 60. The adhesive layer 20, the base layer 30 and the protective layer 60 shown in the constitution example of FIG. 2 are layers which may be optionally disposed. Further, the magnetic recording medium may further comprise a heat sink layer, a soft-magnetic backing layer, an intermediate layer, and the like, between the non-magnetic substrate 10 and the second magnetic recording layer 80. The non-magnetic substrate 10, the adhesive layer 20, the base layer 30, the first seed layer 40, the first magnetic recording layer 50, the protective layer 60, the heat sink layer, the soft-magnetic backing layer, and the intermediate layer may have similar constitutions to those of the first embodiment, respectively.

The second seed layer 70 is a layer for controlling the grain diameter and the crystalline orientation of the magnetic crystal grains in a magnetic layer which is in contact with the second seed layer 70, while ensuring adhesion between the base layer 30 and the second magnetic recording layer 80. Specifically, the second seed layer 70 has a function to promote separation between the magnetic crystal grains and the non-magnetic grain boundary in the magnetic layer formed thereon, to increase the coercive force Hc of the second magnetic recording layer 80 including the above-described magnetic layer. The second seed layer 70 is preferably formed of oxides such as MgO or $SrTiO_3$, or nitrides such as TiN. Particularly preferably, the second seed layer 70 is formed of compounds of NaCl-type crystalline structure. The second seed layer 70 can be formed by any process known in the art such as a sputtering method (including RF magnetron sputtering method), a vacuum deposition method, or the like. The second seed layer 70 can be formed under the state where the non-magnetic substrate 10 is heated at a temperature ranging from 250° C. to 700° C. The second seed layer 70 has a thickness of 0.1 nm or more, preferably from 0.5 nm to 50 nm, and more preferably from 1 nm to 20 nm.

The second magnetic recording layer 80 has a granular structure. The second magnetic recording layer 80 may consist of a single magnetic layer or plural magnetic layers. In the case where the second magnetic recording layer 80 consists of plural magnetic layers, each of the magnetic layers consists of a granular structure. Further, in the case where the second magnetic recording layer 80 consists of plural magnetic layers, it is preferable to dispose an exchange coupling control layer between the adjacent magnetic layers, in order to adjust the magnetic exchange coupling between the adjacent magnetic layers. It is possible to adjust magnetic switching field, by controlling the magnetic exchange coupling at the recording temperature. The exchange coupling control layer may be a magnetic layer or a non-magnetic layer in accordance with the desired exchange coupling. It is preferable to use the non-magnetic layer in order to enhance the effect of reducing the magnetic switching field at the recording temperature.

The magnetic crystal grains in the magnetic layer for composing the second magnetic recording layer 80 is preferably formed of a material comprising at least one element of Co and Fe, and preferably further comprising at least one element among Pt, Pd, Ni, Mn, Cr, Cu, Ag and Au. For example, CoCr-based alloys, CoCrPt-based alloys, FePt-based alloys, FePd-based alloys and the like can be used. The crystalline structure of the magnetic crystal grains may be an ordered structure such as $L1_0$, $L1_1$ and $L1_2$ types, a hexagonal closest packing (hcp) structure, a face-centered cubic (fcc) structure, or the like. Oxides such as ZnO, $SiO_2$, or $TiO_2$, nitrides such as SiN or TiN, C, or B and the like can be used as the material of the non-magnetic body in the magnetic layer for composing the second magnetic recording layer 80

The preferable second magnetic recording layer comprises, but is not limited to, a single layer consisting of an FePt—C magnetic layer, a laminated structure of an FePt—C magnetic layer and an FePt—BC magnetic layer, and the like.

The second magnetic recording layer 80 may be a layer having a Curie temperature Tc different from that of the first magnetic recording layer 50, the purpose of which is control of Tc. The magnetic switching field of the entire magnetic recording medium, which is required at the time of recording, can be reduced by setting the recording temperature in accordance with the Tc's of both of the magnetic layers. For example, the Curie temperature of the second magnetic recording layer 80 is set below that of the first magnetic recording layer 50. Then, if the recording temperature is set between the Curie temperatures of both of the magnetic layers, the magnetic field required to reverse a record is reduced, due to disappearance of the magnetization of the second magnetic recording layer 80 at the time of recording. As described above, it becomes possible to exhibit a favorable magnetic recording performance by reducing the magnetic field generated during recording which is required to a magnetic recording head.

Alternatively, the second magnetic recording layer 80 has a function to maintain magnetization corresponding to intended information to be recorded (for example, information of 0 or 1) in cooperation with the first magnetic recording layer 50 at a temperature where the information is stored, and/or a function of facilitating recording in cooperation with the first magnetic recording layer 50 at a temperature where the information is recorded. In order to attain this purpose, the second magnetic recording layer 80 may have a function to modify magnetic properties, a function to control ferromagnetic resonance frequency for microwave assisted magnetic recording may be added. Here, the magnetic properties to be modified includes an anisotropy constant Ku, a magnetic switching field, a coercive force Hc, a saturation magnetization Ms, and the like.

The magnetic layer(s), the exchange coupling control layer, and the like for forming the second magnetic recording layer 80 can be formed by a sputtering method, a vacuum deposition method, or the like. Further, the substrate may be optionally heated during formation of the magnetic layer(s), the exchange coupling control layer, and the like.

EXAMPLES

Example 1

FePt—Ti/Pt/MgO

A monocrystalline MgO substrate having a flat surface and a (100) crystal face orientation (manufactured by Tateho Chemical Industries Co., Ltd.) was washed to prepare non-magnetic substrate 10. The washed non-magnetic substrate was brought into a sputtering device. Then, the non-magnetic substrate 10 was heated to a temperature of 350° C., and Pt first seed layer 40 of a thickness of 20 nm was formed by an RF magnetron sputtering method using a pure Pt target in Ar gas at a pressure of 0.4 Pa.

Then, the laminated body in which the first seed layer had been formed was heated to a temperature of 350° C., and FePt—Ti first magnetic recording layer 50 of a thickness of 10 nm was formed by an RF magnetron sputtering method using a $Fe_{45}Pt_{55}$ alloy target and a pure Ti target in Ar gas at a pressure of 0.6 Pa. Here, the "$Fe_{45}Pt_{55}$ alloy target" means a target formed of an alloy consisting of 45 at % of Fe and 55 at % of Pt. Further, composition of the FePt—Ti first magnetic recording layer 50 was altered by fixing a power supplied to the $Fe_{45}Pt_{55}$ alloy target at 300 W and changing a power supplied to the pure Ti target in a range from 100 W to 550 W. The composition of the FePt—Ti first magnetic recording layer 50 was analyzed by Rutherford backscattering spectrometry (RBS). The resultant magnetic recording media comprise the non-magnetic substrate 10, the Pt first seed layer 40, and the FePt—Ti first magnetic recording layer 50, in this order. Note that the expression "FePt—Ti" means a material in which a majority of Ti is unevenly distributed in crystal boundaries of FePt, and the expression "FePtTi" means a material in which the uneven distribution of Ti in the crystal boundaries of FePt is not observed significantly.

Figure 3A:
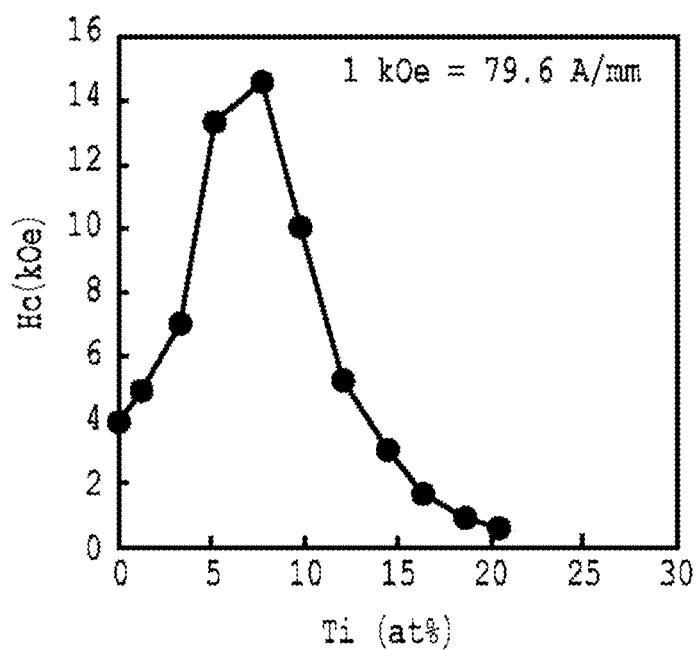
FIG. 3A is a graphical representation showing the relationship between the content of Ti in the first magnetic recording layer and a coercive force of the first magnetic recording layer, in the magnetic recording medium of Example 1 having the Pt first seed layer.
Figure 4:
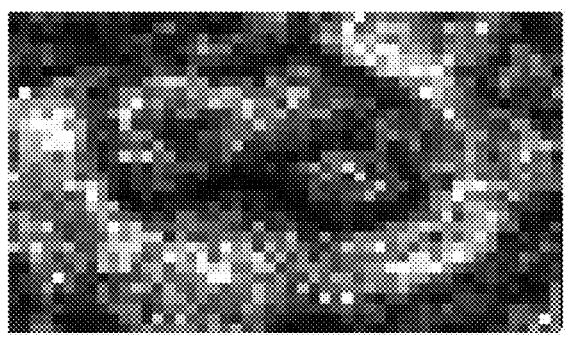
FIG. 4 is diagrams showing the results of EELS analysis of the first magnetic recording layer (Ti=8 at %) of the magnetic recording medium of Example 1, diagram (a) shows the distribution of Fe, diagram (b) shows the distribution of Pt, and diagram (c) shows the distribution of Ti.
Figure 4:
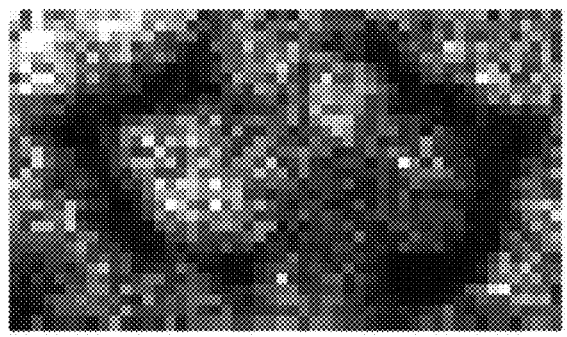
Figure 4:
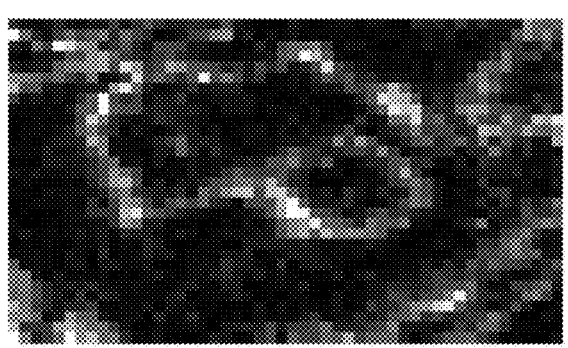
Figure 5A:
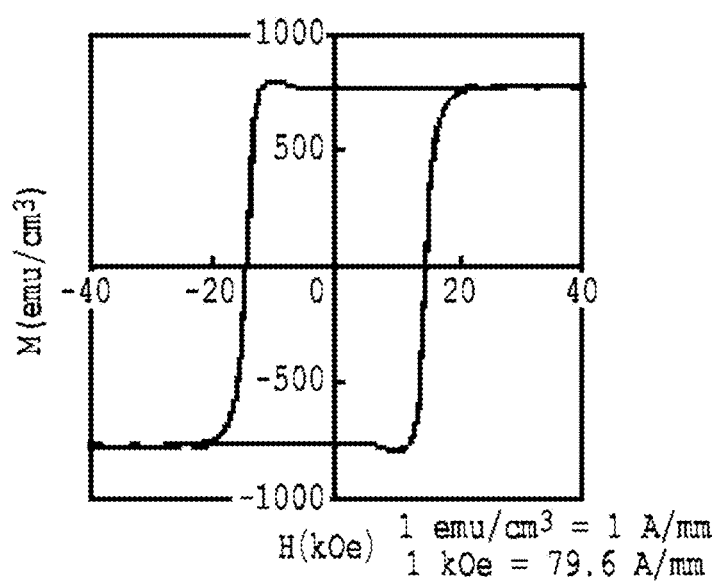
FIG. 5A is a graphical representation showing an M-H hysteresis loop of the magnetic recording medium of Example 1 having the FePt—Ti first magnetic recording layer.

The resultant FePt—Ti first magnetic recording layer 50 was analyzed by an X-ray diffractometry (XRD), so that the presence of magnetic crystal grains consisting of $L1_0$ type ordered alloy was confirmed. Further, distribution of Fe, Pt and Ti in the FePt—Ti first magnetic recording layer 50 in which the content of Ti was 8 at % was analyzed by an electron energy loss spectrometry (EELS). The results are shown in FIG. 4. FIG. 4(*a*) shows the distribution of Fe, FIG. 4(*b*) shows the distribution of Pt, and FIG. 4(*c*) shows the distribution of Ti. Besides, the FePt—Ti first magnetic recording layer 50 in which the content of Ti was 8 at % had a composition of 42 at % of Fe, 50 at % of Pt, and 8 at % of Ti. Further, M-H hysteresis loops of the resultant magnetic recording media were measured by a vibrating sample Magnetometer (VSM) at a room temperature, to obtain a coercive force Hc. The relationship of the content of Ti in the FePt—Ti first magnetic recording layer 50 and the coercive force Hc is shown in FIG. 3A. Further, the M-H hysteresis loop of the magnetic recording medium in which the content of Ti in the FePt—Ti first magnetic recording layer 50 is 8 at % is shown in FIG. 5A.

Comparative Example 1

FePtTi/MgO

The procedure of Example 1 was repeated except that the Pt first seed layer 40 was not formed, to obtain magnetic recording media.

Figure 3B:
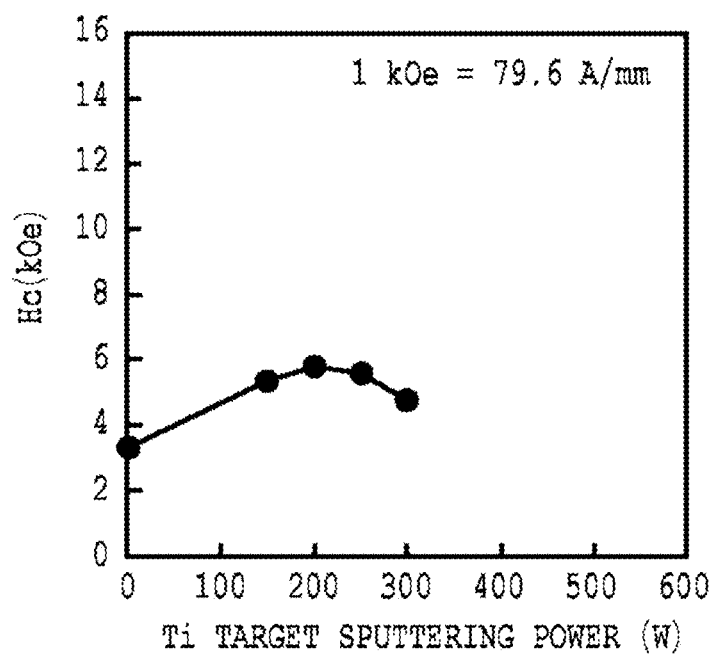
FIG. 3B is a graphical representation showing the relationship between the content of Ti in the first magnetic recording layer and a coercive force of the first magnetic recording layer, in the magnetic recording medium of Comparative Example 1 not having the Pt first seed layer.
Figure 6:
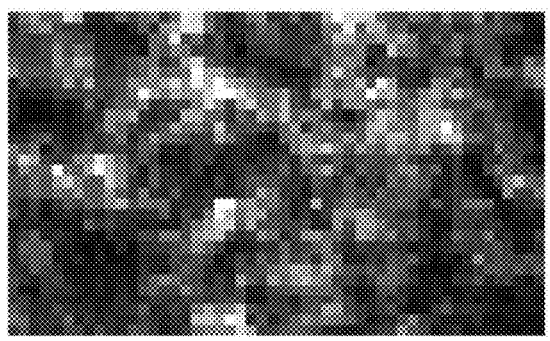
FIG. 6 is diagrams showing the results of EELS analysis of the first magnetic recording layer (Ti=4 at %) of the magnetic recording medium of Comparative Example 1 not having the Pt first seed layer, diagram (a) shows the distribution of Fe, diagram (b) shows the distribution of Pt, and diagram (c) shows the distribution of Ti.
Figure 6:
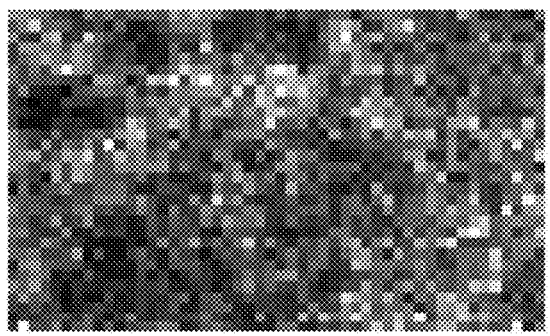
Figure 6:
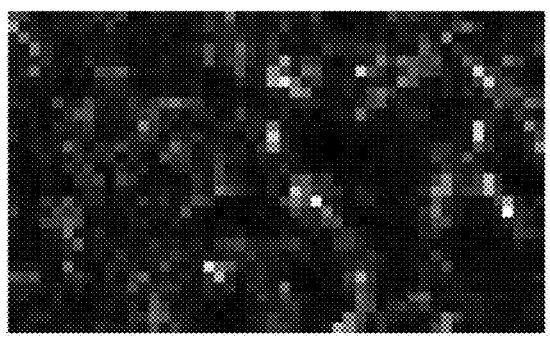
Figure 7A:
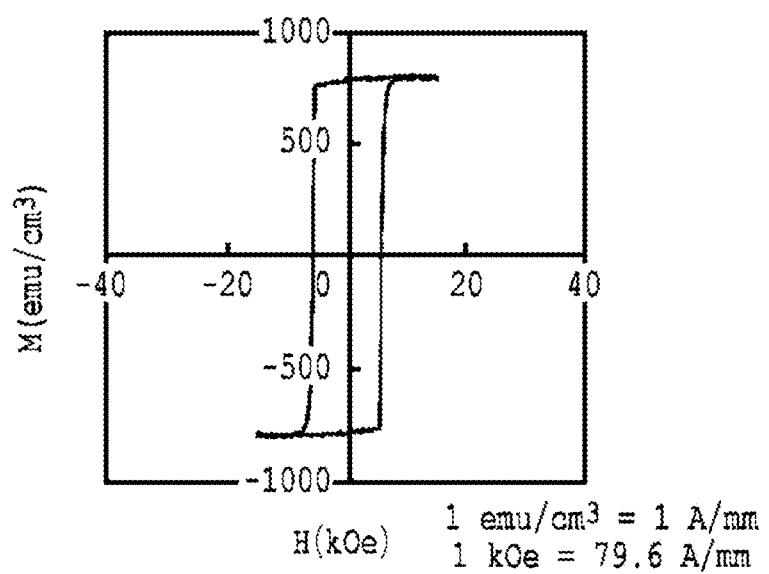
FIG. 7A is a graphical representation showing an M-H hysteresis loop of the magnetic recording medium of Comparative Example 1 having the FePt—Ti first magnetic recording layer but not the Pt first seed layer.

The presence of magnetic crystal grains consisting of $L1_0$ type ordered alloy was confirmed by the XRD analysis. Distributions of Fe, Pt and Ti in the FePtTi first magnetic recording layer in which the content of Ti was 4 at % are shown in FIG. 6. FIG. 6(*a*) shows the distribution of Fe, FIG. 6(*b*) shows the distribution of Pt, and FIG. 6(*c*) shows the distribution of Ti. The relationship of the content of Ti in the FePtTi first magnetic recording layer and the coercive force Hc is shown in FIG. 3B. Since the content of Ti was controlled by the power applied to the pure Ti target, the horizontal axis in FIG. 3B shows the power applied to the pure Ti target. In the case where the sputtering power of the Ti target was 200 W, the content of Ti was 4 at %. Further, the M-H hysteresis loop of the magnetic recording medium in which the content of Ti in the FePtTi first magnetic recording layer is 4 at % is shown in FIG. 7A.

Comparative Example 2

FePt/Pt/MgO

The procedure of Example 1 was repeated except that an FePt first magnetic recording layer was formed by an RF magnetron sputtering method using the $Fe_{45}Pt_{55}$ target only, to obtain a magnetic recording medium.

Figure 5B:
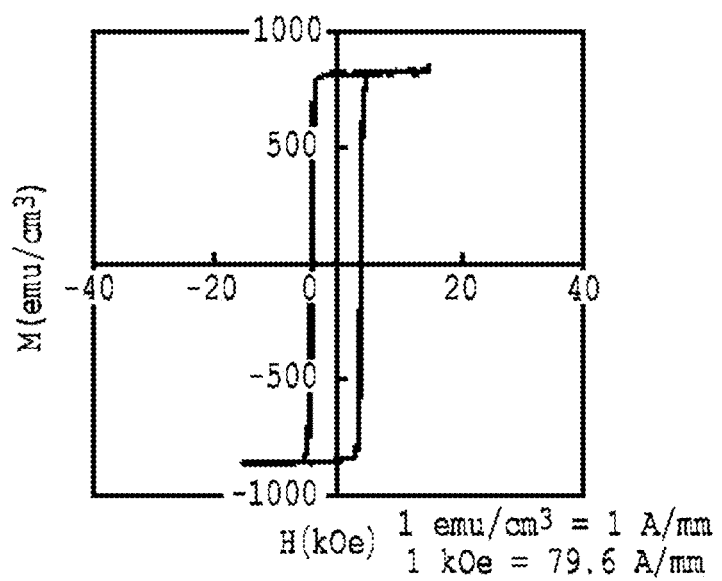
FIG. 5B is a graphical representation showing an M-H hysteresis loop of the magnetic recording medium of Comparative Example 2 having the FePt first magnetic recording layer.

The presence of magnetic crystal grains consisting of $L1_0$ type ordered alloy was confirmed by the XRD analysis. The M-H hysteresis loop of the resultant magnetic recording medium is shown in FIG. 5B.

Comparative Example 3

FePt/MgO

The procedure of Example 1 was repeated except that the Pt first seed layer 40 was not formed and that an FePt first magnetic recording layer was formed by an RF magnetron sputtering method using the $Fe_{45}Pt_{55}$ target only, to obtain a magnetic recording medium.

Figure 7B:
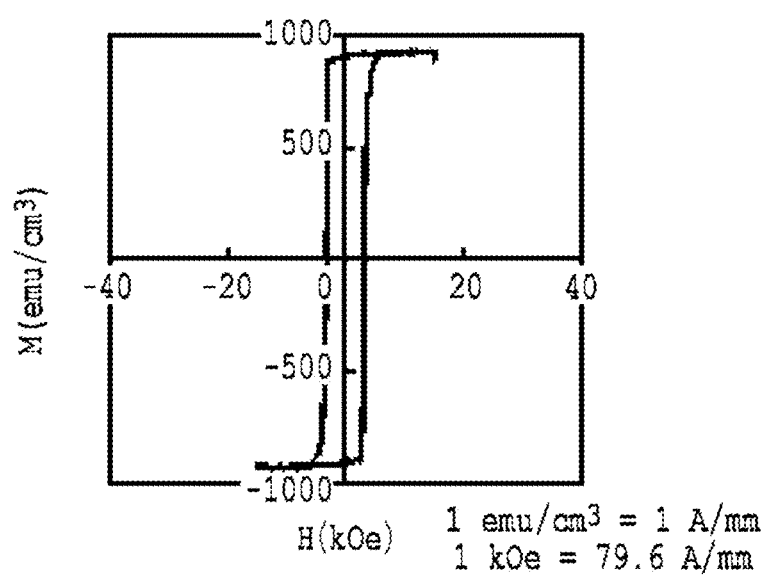
FIG. 7B is a graphical representation showing an M-H hysteresis loop of the magnetic recording medium of Comparative Example 3 having the FePt first magnetic recording layer but not the Pt first seed layer.

The presence of magnetic crystal grains consisting of $L1_0$ type ordered alloy was confirmed by the XRD analysis. The M-H hysteresis loop of the resultant magnetic recording medium is shown in FIG. 7B.

Comparative Example 4

FePtCu/Pt/MgO

The procedure of Example 1 was repeated except that an FePtCu first magnetic recording layer was formed by an RF magnetron sputtering method using the $Fe_{45}Pt_{55}$ target and a pure Cu target, to obtain magnetic recording media.

Figure 8:
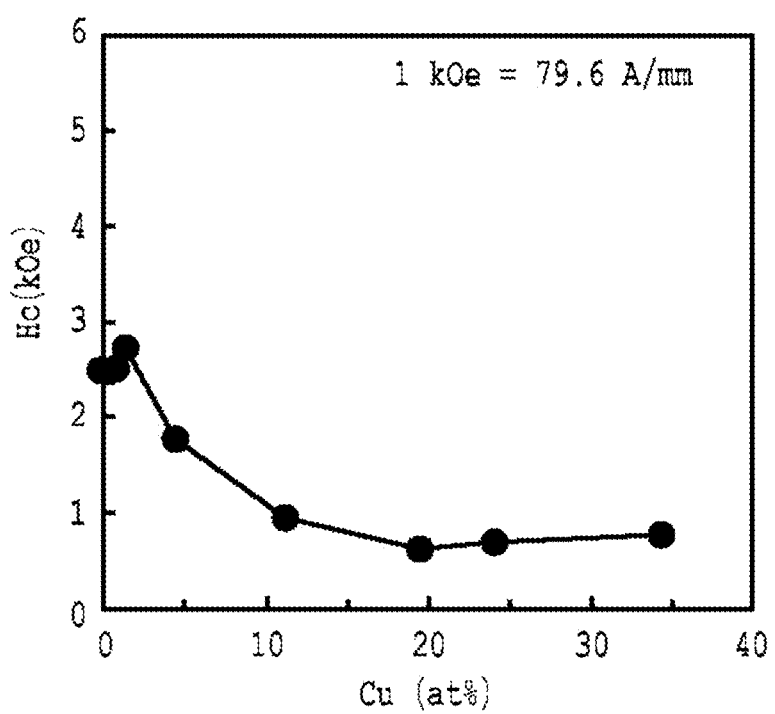
FIG. 8 is a graphical representation showing the relationship between the content of Cu in the first magnetic recording layer and a coercive force of the first magnetic recording layer, in the magnetic recording medium of Comparative Example 4 in which the FePtCu first magnetic recording layer is formed onto the Pt first seed layer.

The presence of magnetic crystal grains consisting of $L1_0$ type ordered alloy was confirmed by the XRD analysis. The relationship between the content of Cu in the FePtCu first magnetic recording layer and the coercive force Hc is shown in FIG. 8.

(Evaluation)

As shown in FIG. 3A, a steep increase of the coercive force Hc was observed in the content range of Ti in the first magnetic recording layer of 4 at % or more and 12 at % or less, in the magnetic recording media of Example 1 in which the FePt—Ti first magnetic recording layer 50 was formed on the Pt first seed layer. Especially, the maximum value of 14.6 kOe (1160 A/mm) of the coercive force Hc was observed in the case where the content of Ti was 8 at %. On the other hand, as shown in FIG. 3B, increase of the coercive force Hc with increasing the content of Ti was observed in the magnetic recording media of Comparative Example 1 in which the first magnetic recording layer was formed on the non-magnetic substrate 10, but the variation of the coercive force was very gentle in comparison with the magnetic recording media of Example 1. In view of the above result, it is understood that remarkably high coercive force Hc is obtained by the interaction between the Pt first seed layer 40 and the FePt—Ti first magnetic recording layer 50.

Further, good phase-separation between Fe and Ti was confirmed by comparison among FIGS. 4(a)-(c), in the magnetic recording media of Example 1 in which the FePt-Ti first magnetic recording layer 50 was formed on the Pt first seed layer. Besides, in the EELS analysis result shown in FIGS. 4 and 6, bright parts show the presence of the element to be analyzed, and dark parts show the absence of the element to be analyzed. On the other hand, phase-separation between Fe and Ti was not clearly observed, as shown in subfigures (a)-(c) in FIG. 6, in the magnetic recording medium of Comparative Example 1 in which the first magnetic recording layer was formed on the non-magnetic substrate 10. In view of these results, it is understood that the Pt first seed layer 40 greatly affects the phase separation between the FePt magnetic crystal grains and the Ti non-magnetic grain boundary in the FePt—Ti first magnetic recording layer 50. Not intending to be bound to any theories, it is estimated that the difference in the phase separation between the FePt magnetic crystal grains and the Ti non-magnetic grain boundary in the FePt—Ti first magnetic recording layer 50 is affected by the difference in surface energies of the Pt first seed layer 40 and the non-magnetic substrate 10 which are formed under the magnetic recording layer. Here, the surface energy of monocrystalline MgO is 1.5 $J/cm^2$, and the surface energy of Pt is 2.7 $J/cm^2$.

Further, in comparison between FIGS. 5A and 5B, it is understood that the magnetic recording media of Example 1 in which the FePt—Ti magnetic recording layer 50 was formed on the Pt first seed layer 40 had a residual magnetization (magnetization M at H=0) similar to the magnetic recording medium of Comparative Example 2 in which the $Fe_{45}Pt_{55}$ first magnetic recording layer is formed on the Pt first seed layer 40. On the other hand, as shown in the M-H hysteresis loop of FIG. 5B, the recording medium of Comparative Example 2 had a coercive force Hc of 3.9 kOe (310 A/mm). In view of this result, it is confirmed that the coercive force Hc was increased by disposing the first magnetic recording layer comprising the Ti non-magnetic grain boundary onto the Pt first seed layer. Further, it is understood that the magnetic recording media of Example 1 had a larger hysteresis area and a harder magnetic properties, in comparison with the magnetic recording medium of Comparative Example 2.

Further, in comparison with the magnetic recording medium of Comparative Example 3 comprising the FePt first magnetic recording layer, a slight decrease in residual magnetization was observed in the magnetic recording medium of Comparative Example 1 comprising the FePtTi first magnetic recording layer 50, although the magnetic recording medium of Comparative Example 1 had a larger coercive force Hc, as understood from comparison between the M-H hysteresis loops shown in FIGS. 7A and 7B. In comprehensive consideration of FIGS. 6(a)-(c), FIG. 7A, and FIG. 7B, it is understood that (100) monocrystalline MgO does not greatly affect the phase separation of the non-magnetic grain boundary in the first magnetic recording layer.

Further, as shown in FIG. 8, the magnetic recording media of Comparative Example 4 comprising the first magnetic recording layer in which Cu was added to FePt exhibited a coercive force Hc which reduced with increase of the addition amount of Cu. This result exhibits that the effect for promoting the phase separation by the Pt first seed layer 40 is not achieved by addition of Cu.

REFERENCE SIGNS LIST

10 Non-magnetic substrate
20 Adhesive layer
30 Base layer
40 First seed layer
50 First magnetic recording layer
60 Protective layer
70 Second seed layer
80 Second magnetic recording layer

The invention claimed is:

1. A magnetic recording medium comprising a non-magnetic substrate, a first seed layer, and a first magnetic recording layer formed on the first seed layer, wherein: the first seed layer comprises Pt;
the first magnetic recording layer comprises one or more magnetic layers, the magnetic layer in contact with the first seed layer comprises Fe, Pt and Ti; and the magnetic layer in contact with the first seed layer has a granular structure consisting of magnetic crystal grains of a $L1_0$ type ordered alloy comprising Fe and Pt, and non-magnetic grain boundaries consisting of Ti.

2. The magnetic recording medium according to claim 1, wherein the magnetic layer in contact with the first seed layer comprises 4 at % or more and 12 at % or less of Ti, based on the total number of atoms.

3. The magnetic recording medium according to claim 1, wherein the $L1_0$ type ordered alloy further comprises at least one element selected from the group consisting of Ni, Mn, Ag, Au and Cr.

4. The magnetic recording medium according to claim 1, wherein the first magnetic recording layer consists of one magnetic layer.

5. The magnetic recording medium according to claim 1, further comprising a second seed layer and a second magnetic recording layer between the non-magnetic substrate and the first seed layer, wherein the second magnetic recording layer is in contact with the first seed layer.

6. The magnetic recording medium according to claim 1, further comprising one or more layers selected from the group consisting of a heat sink layer, an adhesive layer, a soft magnetic backing layer, and a base layer, between the non-magnetic substrate and the first seed layer.

* * * * *